United States Patent
Olson et al.

(10) Patent No.: US 11,062,693 B1
(45) Date of Patent: Jul. 13, 2021

(54) SILENCE CALCULATOR

(71) Applicant: West Corporation, Omaha, NE (US)

(72) Inventors: Terry Olson, Bennington, NE (US); Mark Sempek, Blair, NE (US); Roger Wehrle, Omaha, NE (US)

(73) Assignee: West Corporation, Omaha, NE (US)

( * ) Notice: Subject to any disclaimer, the term of this patent is extended or adjusted under 35 U.S.C. 154(b) by 91 days.

(21) Appl. No.: 16/447,394

(22) Filed: Jun. 20, 2019

(51) Int. Cl.
*G10L 13/08* (2013.01)
*H04M 3/493* (2006.01)
*G10L 13/047* (2013.01)
*G10L 13/00* (2006.01)

(52) U.S. Cl.
CPC .............. *G10L 13/08* (2013.01); *G10L 13/00* (2013.01); *G10L 13/047* (2013.01); *H04M 3/493* (2013.01); *G10L 2013/083* (2013.01)

(58) Field of Classification Search
CPC ......... G10L 13/00; G10L 13/08; G10L 13/10; G10L 13/033; G10L 2013/083
See application file for complete search history.

(56) References Cited

U.S. PATENT DOCUMENTS

| 8,024,174 B2 * | 9/2011 | Wang | G06F 40/44 704/6 |
| 8,634,947 B1 * | 1/2014 | Kleinpeter | G06F 16/686 700/94 |
| 10,242,669 B1 * | 3/2019 | Sandler | G10L 15/19 |
| 2005/0091062 A1 * | 4/2005 | Burges | G11B 27/28 704/273 |
| 2007/0129938 A1 * | 6/2007 | Wang | G06F 40/44 704/10 |
| 2009/0287486 A1 * | 11/2009 | Chang | G10L 13/06 704/235 |

FOREIGN PATENT DOCUMENTS

CN 107910021 A * 4/2018

* cited by examiner

*Primary Examiner* — Paras D Shah
*Assistant Examiner* — Darioush Agahi

(57) ABSTRACT

To provide a more natural sounding set of voice prompts of an interactive voice response (IVR) script, the voice recordings of the prompts may be modified to have a predetermined amount of silence at the end of the recording. The amount of silence required can be determined from the context in which the voice prompt appears in the IVR script. Different contexts may include mid-sentence, terminating in a comma, or a sentence ending context. These contexts may require silence periods of 100 ms, 250 ms and 500 ms respectively. Voice files may be trimmed to remove any existing silence and then the required silence period may be added.

17 Claims, 4 Drawing Sheets

SILENCE CALCULATOR

FIELD OF THE INVENTION

This disclosure relates to systems and methods for generating voice scripts for use in call centers, interactive voice response (IVR) systems and the like.

BACKGROUND OF THE INVENTION

Interactive Voice Response (IVR) systems use voice scripts containing a series of voice prompts that are played to a caller during a conversation. The voice scripts are logically constructed and software controls what prompt will be played depending on the caller's responses.

To encourage callers to persist with calls to IVR based systems, it is preferably to create as human a feel as possible for the flow of the conversation.

What is required is an improved system and method for enhancing the feel of a call system based on playing of voice prompts.

SUMMARY OF THE INVENTION

To provide a more natural sounding set of voice prompts of an interactive voice response (IVR) script, the voice recordings of the prompts may be modified to have a predetermined amount of silence at the end of the recording. The amount of silence required can be determined from the context in which the voice prompt appears in the IVR script. Different contexts may include mid-sentence, terminating in a comma, or a sentence ending context. These contexts may require silence periods of 100 ms, 250 ms and 500 ms respectively. Voice files may be trimmed to remove any existing silence and then the required silence period may be added.

In one aspect of the disclosure, there is provided a system for processing a plurality of unique voice prompt recordings of an interactive voice response (IVR) program. The system comprises a silence processing module comprising at least one processor and at least one operatively associated memory. The silence processing module may be programmed to determine, for a plurality of unique voice prompts of the IVR program, a context of the respective unique voice prompt within the IVR program. The silence processing module may determine a silence period for the respective unique voice prompt that is dependent on the determined context for the respective unique voice prompt, generate a modified version of the unique voice prompt recording pertaining to the respective unique voice prompt comprising a period of silence at the end of the version matching the determined silence period, and store the modified version of the unique voice prompt recording.

In one aspect of the disclosure, there is provided a method for processing a plurality of unique voice prompt recordings of an interactive voice response (IVR) program. The method comprising, for a plurality of the unique voice prompts determining a context of the respective unique voice prompt within the IVR program, determining a silence period for the respective unique voice prompt that is dependent on the determined context for the respective unique voice prompt, generating a modified version of the unique voice prompt recording pertaining to the respective unique voice prompt comprising a period of silence at the end of the version matching the determined silence period, and storing the modified version of the unique voice prompt recording.

In one aspect of the disclosure, there is provided a non-transitory computer readable medium comprising instructions, that when read by a processor, cause the processor to perform, for a plurality of the unique voice prompts determining a context of the respective unique voice prompt within the IVR program, determining a silence period for the respective unique voice prompt that is dependent on the determined context for the respective unique voice prompt, generating a modified version of the unique voice prompt recording pertaining to the respective unique voice prompt comprising a period of silence at the end of the version matching the determined silence period, and storing the modified version of the unique voice prompt recording.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
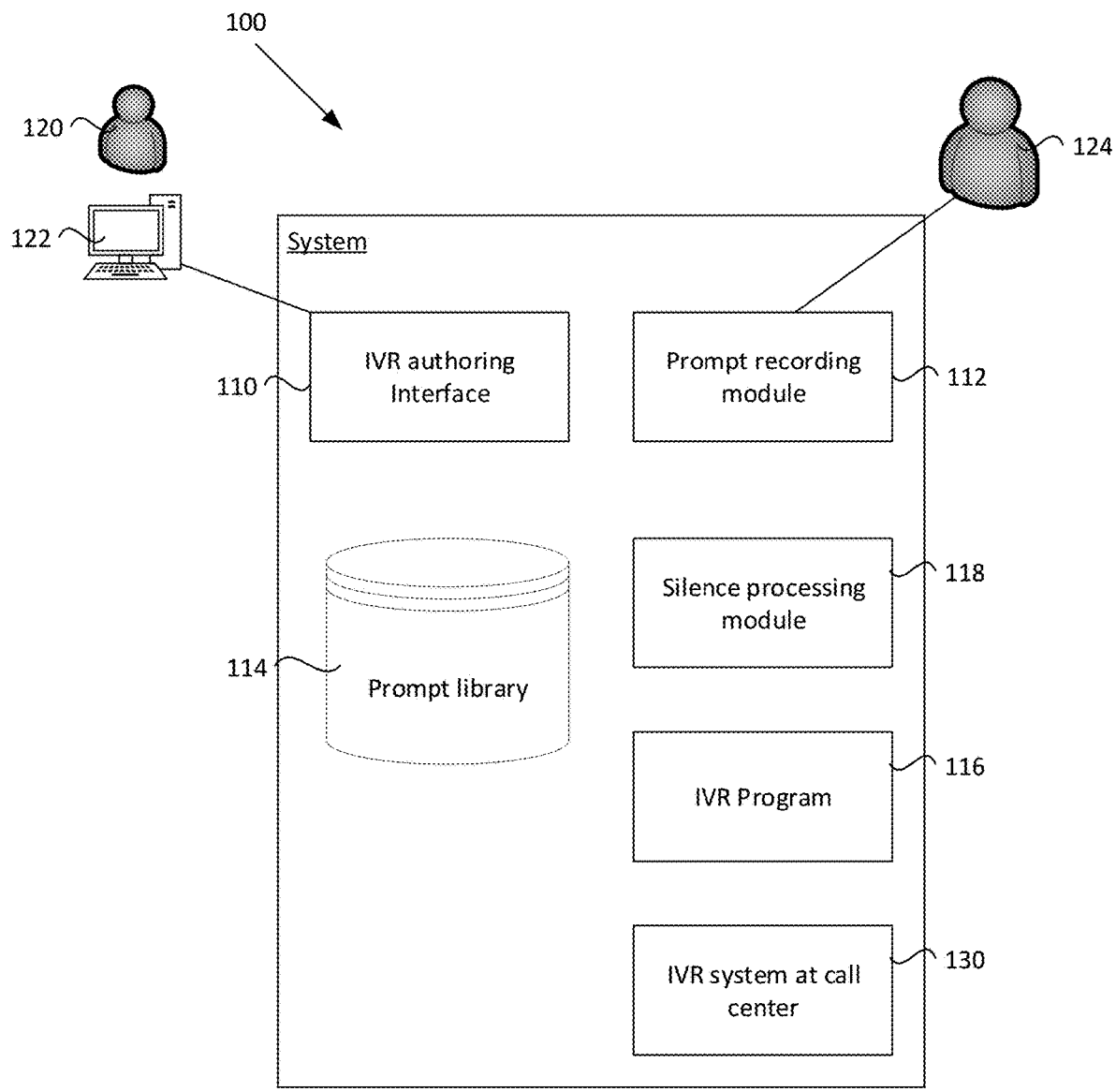
FIG. 1 shows a system diagram for an IVR authoring system, including silence processing.

In FIG. 1, there is shown a system 100 for generating IVR voice prompts with standardized silence periods that enhance the natural sounding qualities of the voice prompts. The system 100 provides an authoring interface 110 to a user 120, e.g. a Dialogue Designer who creates the IVR prompt list (script), at a device 122 such as a computer. The interface 110 enables the user to author an IVR program having a series of voice prompts. The dialogue designer forms the IVR program in its entirety, from which a full prompt list is generated. An audio team may determine 'unique' vs 'replicate' prompts. The series of unique voice prompts have a logical and flowing structure that determine in what order the voice prompts will be played. The logical order can be dependent upon caller responses to the prompts. Authoring software for creating IVR programs is generally known in the art and thus no further discussion of the authoring software is considered to be required herein.

Once an IVR program has been generated on the interface 110, the unique voice prompts required for the IVR program may be recorded. A voice actor 124 or similar person may be employed to interface with a recording module 112. An individual voice file is recorded for each unique voice prompt. The individual voice files may be stored in the voice prompt library 114 in association with the IVR program and in particular, in association with the text form of the unique voice prompt. Sound files may be stored in any appropriate sound recording format, such as .wav, .mp3, .mp4, etc.

Once voice files have been recorded, edited into individual prompts and converted into platform required formatted files, then the IVR program 116 is ready to be deployed and used by an IVR system 130, such as provided by a call center or similar.

As outlined briefly above, to provide a more human feel to an interactive voice response system, it is important for there to be appropriate periods of silence when playing voice prompts to a caller. The period of silence that should follow a voice prompt may depend on the context in which the voice prompt occurs.

In accordance with an embodiment of the present disclosure, voice files may be processed by a silence processing module 118 to provide standardized silence periods at the end of each voice prompt recording. The standardized silence periods may be context based, as will be described in more detail below.

Figure 2:
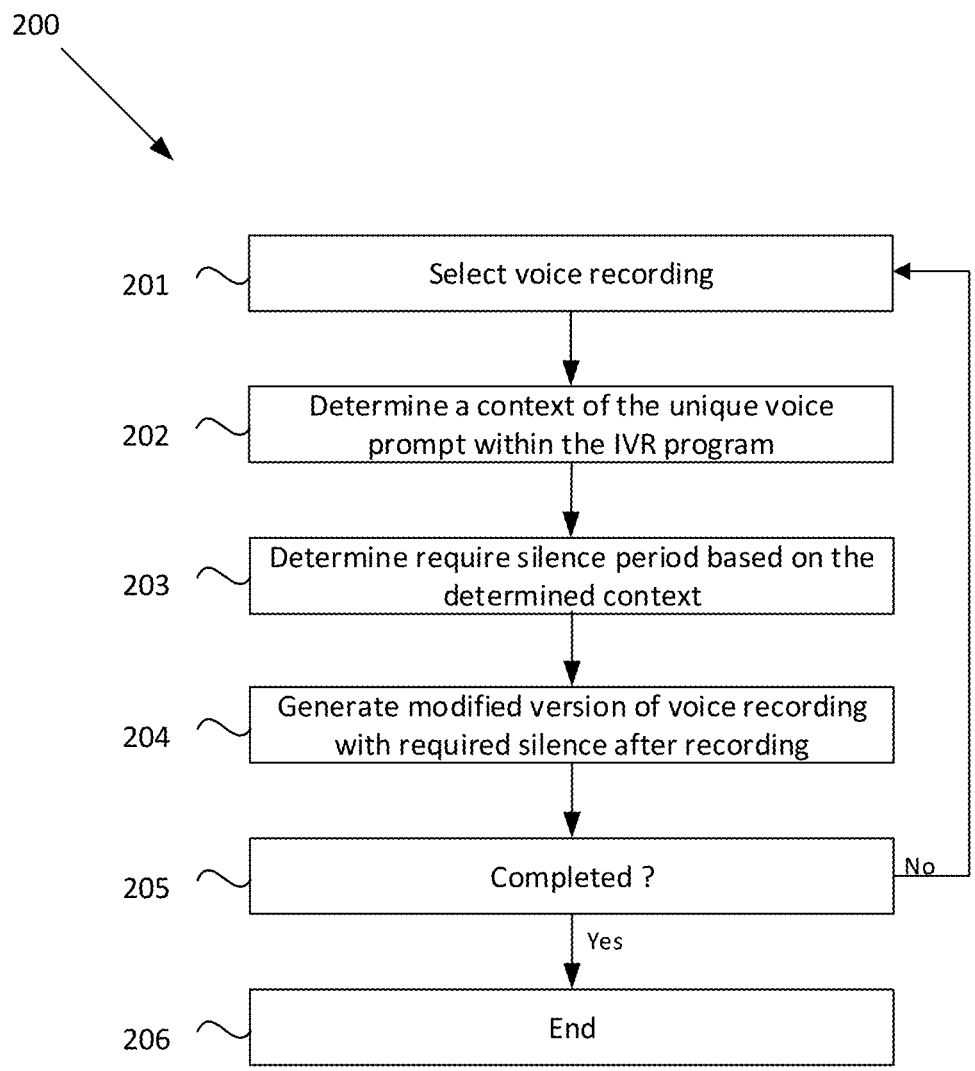
FIG. 2 shows a flowchart of a method for processing a set of voice prompts to include a context based silence period.

FIG. 2 shows a flowchart 200 of a process for standardizing silence periods for a series of voice prompts. At step 201, a voice recording of a unique prompt of an IVR program is selected. At step 202, a context of the voice recording is determined and from the context, a required silence period is determined (step 203). At step 204, a modified version of the recording is generated having the required silence period at the end of the recording. If further voice recordings require processing, determined at step 205, then the process returns to select the next voice recording (step 201). Otherwise, the process ends. The steps above may be performed per voice prompt, or in batches. That is, a first batch process may determine the context for all prompts and then a second batch process may be executed to produce the modified versions of the voice prompts.

In one embodiment, the context may be a punctuation context. A study of natural silence times for different scenarios determined three different silence intervals to restore natural sounding voice prompt playback. The three different punctuation contexts were: sentence ending punctuation (such as a period, question mark or exclamation point); a comma; or no punctuation. While three specific contexts are described herein, the person skilled in the art would readily understand that further investigation of natural conversations may determine more detailed and nuanced contexts requiring a greater or lesser number of unique silence periods to be applied. Appropriate silence lengths were determined to be as follows:

500 ms (after sentence ending punctuation);
250 ms (after a pause, notated with a comma or semicolon);
100 ms (between words without punctuation).

Specific examples will now be provided.

Example 1

In the example, there may be individual or unique recordings for the following phrases:
"You can say" [Phrase_1]
"repeat that" [Phrase_2]
"make a payment now" [Phrase_3]
"If you're done, just say 'main menu' or simply hang up". [Phrase_4]

A combined voice prompt may be required that combines all of these phrases, with punctuation, into a single phrase that is played as:
"You can say 'repeat that', 'make a payment now'. If you're done, just say 'main menu' or simply hang up".

To produce such a script, a user may create a punctuated phrase string comprising the unique phrases as follows:
[Phrase_1] [Phrase_2], [Phrase_3]. [Phrase_4].

For the silence determining process to be used for combining the unique prompts into a single playable recording, the specific content of the unique phrases is not relevant. All that is relevant for the silence determining process is the punctuation that separates the unique recordings.

Example 2

In a further example, there may be an IVR program that relates to a service request. A section of the IVR script may be as follows:
"If you are calling to order service for your home, press 1. If you are calling to order service for your business, press 2".

The above prompt may be broken into a series of unique voice prompts as follows:
"If you are calling to order service for" [Phrase_1]
"your home" [Phrase_2]
"press 1." [Phrase_3]
"If you are calling to order service for" [Phrase_1]
"your business" [Phrase_4]
"press 2." [Phrase_5].

A combination of the unique voice prompts would thus appear as follows:
[Phrase_1] [Phrase_2], [Phrase_3]. [Phrase_1] [Phrase_4], [Phrase_5].

The above examples provide short sections of an overall IVR script. Typically, an IVR script will comprise many more unique voice prompts.

The silence processing module may utilize at least one processor and operatively associated memory. The memory may store software instructions that are executable by the processor. The software may be programmed to process text of an IVR script to determine the context of each unique voice prompt within an IVR program. Specifically, the silence processing module may determine the punctuation context for a unique voice prompt within the IVR script. Once the context has been determined, a silence period may be assigned to the unique voice prompt. Voice file processing software, such as the Sound Forge™ studio, may then be employed to firstly trim any silence from the end of the original voice prompt and then add the required period of silence to the voice prompt.

For Example 1 shown above, Phrase_1 would require a 100 ms silence, Phrase_2 would require a 250 ms silence, and Phrase_3 and Phrase_4 would each require a 500 ms silence, as determined by their respective punctuation contexts. For Example 2 shown above, Phrase_1 would require a 100 ms silence, Phrase_2 and Phrase_4 would require 250 ms and Phrase_3 and Phrase_5 would each require 500 ms.

Utilizing Sound Forge digital audio workstation or similar voice processing software, each voice prompt may be modified to include the required silence period. As a first step 'Audio Trim/Crop' is employed to clear out any excess space from the beginning and end of the prompt, leaving 20 ms of silence. This is necessary to avoid adding the determined silence in addition to any lingering silence already on the prompt. The settings leave 20 ms of silence after the level goes below −40 db. Once a prompt has been 'Audio Trim/Cropped, appropriate silence is then added to the back end.

Figure 3:
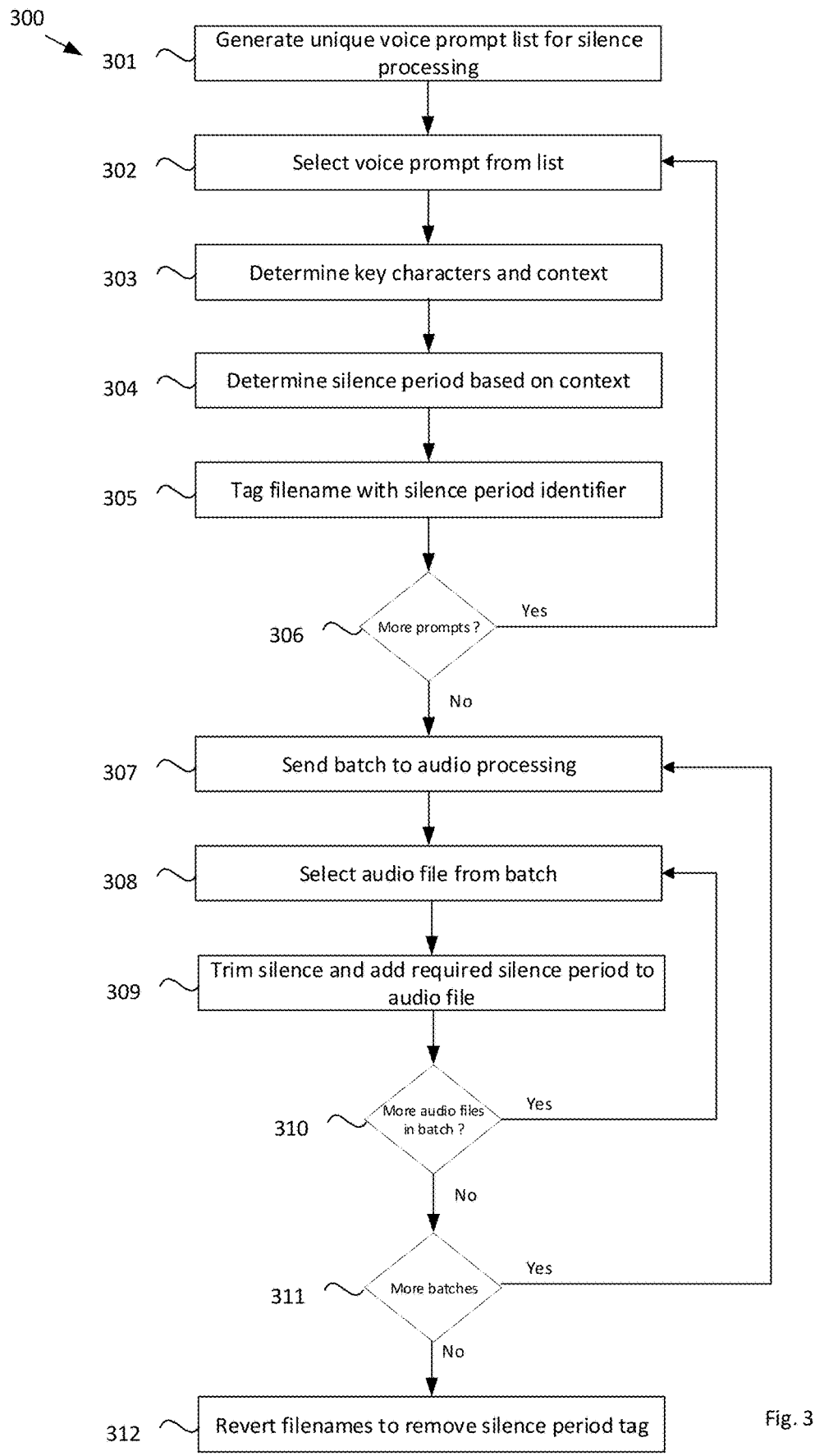
FIG. 3 shows a flowchart of a method for batch processing voice prompts.

In one embodiment, the silence processing step may be performed as a batch script. A batch process 300 is shown in FIG. 3. At step 301, a series of unique voice prompts are identified. In one embodiment, the unique voice prompts may be identified as being associated with an IVR program or script. That is, all prompts within a script may be silence processed in one batch.

It will be appreciated that the silence processing described herein may be applied to virtually any IVR script, and thus scripts may be sent for silence processing well after authoring, including after extensive in-field use.

While it may be convenient to identify prompts for silence processing by the IVR program or script, other methods of grouping prompts into batches may be deployed. For example, the most commonly used prompts may be batched and processed. Other methods for identifying the priority of silence processing will be apparent to the person skilled in the art.

For some authoring software, a unique prompts list can be generated as an executable macro or similar tool. The tool identifies the prompt as a named entity, i.e. having a filename. The filename further identifies the text of the unique prompt.

At step 302, the batch sequentially selects a prompt from the unique prompts list and determines the key character(s) of the text of the prompt that will determine the silence period (step 303). At step 304, the silence period is determined and the prompt filename is modified (step 305) to tag the silence required for the particular file. In one embodiment, the filename name may be tagged to include a prefix, e.g. 100ms_Filename.xxx that the silence period required. This naming standard allows the silence period to be readily identified, whilst preserving the original name of the prompt.

If there are further prompts in the prompts list requiring tagging (determination 306), then the process returns to step 302 to select the next prompt.

The naming process establishes three batch jobs to apply the silence options to all prompts. There is a batch job for 100 ms, one for 250 ms, and one for 500 ms of silence added to the end of each prompt. As discussed above, there may be more or less than three different silence periods and thus the number of groups of files will depend on the number of silence periods. Once filename tagging is complete (determination 306) the process continues where the files are processed to trim any existing silence and append the required silence period to the corresponding sound files.

At step 307, a first batch of commonly tagged prompts is provided to the Sound Forge or similar audio processing workstation. The entire group of prompts for each desired silence amount is processed at one time, adding efficiency.

At step 308, a first file within the batch is selected. The audio trim and append process described above is deployed (step 309) to firstly trim any silence from the start and end of the prompt and then add the required amount of silence, as identified for the batch and/or from the filename. At step 310, the process determines if there are more prompts in the batch. If so, the process returns to step 308. Otherwise, a determination is made 311 if there are further batches for processing. If so, the process returns to step 307. Otherwise, with all of the prompt voice files now containing the required silence periods based on their usage contexts, a batch file can be executed that reprocesses the files 312 to remove the silence period tagging from the filenames.

In the embodiments described herein, relatively simple example sections of IVR scripts have been provided. The silence processing module may be programmed to handle more complicated sections of scripts, included concatenated scripts. In one such example, an IVR script may include variable parameters that are only determined at the time of deployment. For example, an IVR script to handle multiple pay per view events may include a prompt as follows:

"I see you've ordered multiple pay per view events. For [Event Title (e.g. Event_1]"

This phrase has a variable parameter within the square brackets [ ] and a space preceding the variable. The use of such concatenated prompts allows a single prompt to be used with variations when the particular events change, without requiring the prompt to be re-recorded for each event. Rules may determine that this form of prompt requires a 100 ms silence.

A subsequent prompt may be as follows:

"I didn't get that . . . for, [Event Title]"

This phrase has a comma (,) prior to the brackets depicting the variable and rules for this form of prompt may specify that a 250 ms silence is required.

It can thus be seen that a complex set of rules can be determined that covers all forms of prompts, including concatenated prompts.

In some instances, a single portion of speech may be replicated through the IVR program. For example, the phrase "Press zero to return to main menu" may appear in isolation, i.e. followed by sentence ending punctuation (.). The phrase may also appear as "Press zero to return to main menu or hang up.", which terminates mid-sentence. Thus, a particular prompt may have multiple contexts. Multiple versions of such prompts may be created with different silence periods. Thus, a unique prompt may comprise not just unique speech, but a unique combination of speech and silence period. The versions may be uniquely identified to enable their context to be accurately determined.

An advantage of the silence processing module is that the author does not need to consider the silence periods when drafting the prompts in text form. The silence processing module is able to determine the appropriate silence period once the full IVR script has been drafted. The silence processing module is also able to process existing IVR scripts to create a more natural sound to the voice prompts used therein. A further advantage includes that accurate recording of the silence periods is not required at the voice recording stage since prompts can be later processed and silence periods added based on the context.

It will be understood by the person skilled in the art that unique voice prompts may be used multiple times within an IVR program but in different contextual environments. For example, the unique voice prompt "Press zero" may occur in a first phrase such as "To return to the main menu, press zero.". In this form, the prompt "Press zero" has a sentence ending context. A second phrase within the same IVR program may be "If you are finished, press zero or simply hang up". In this form, the prompt "Press zero" has an unpunctuated (i.e. mid-sentence) context. Multiple versions of a unique prompt may be created with different silence periods.

Figure 4:
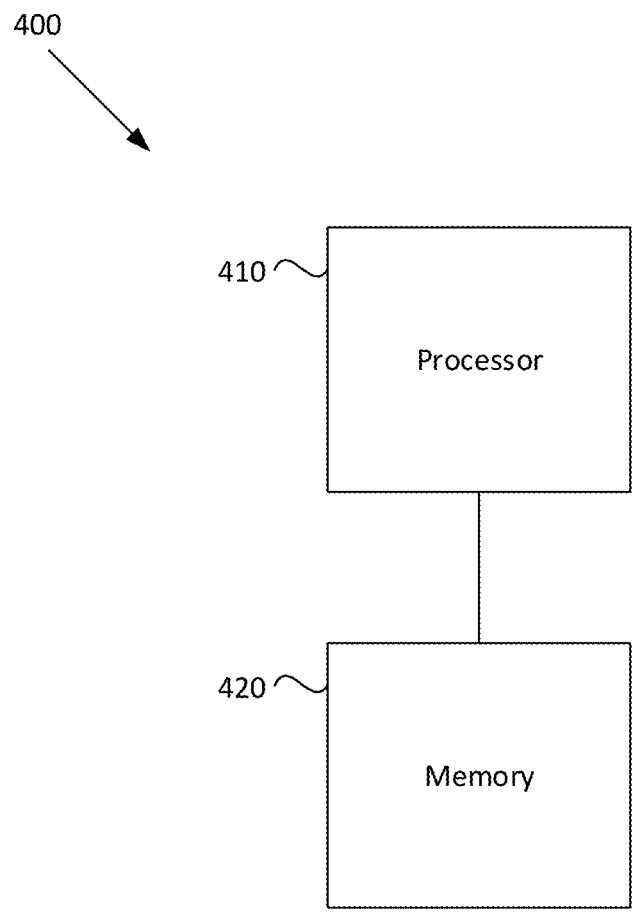
FIG. 4 shows a processor and memory that may implement a silence processing module.

The silence processing module may be implemented in software, hardware, firmware or a combination of software, hardware and firmware. In a hardware embodiment 400 depicted in FIG. 4, the silence processing module may include at least one processor 410 and at least one operatively associated memory 420. The memory 420 may store software and/or instruction sets for execution by the processor 410. The memory 420 may include both random access memory for use in executing instruction sets as well as memory for storing the instructions and any data associated with the process, such as voice files, text prompts, etc. In one particular embodiment, the memory 420 may store instructions that, when executed by the process, cause the processor to determine a context of a unique voice prompt, determine a silence period for the unique voice prompt based on the context, and generate a modified version of a voice recording of the unique voice prompt having the required silence period.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for processing a plurality of recordings of a plurality of unique voice prompts of an interactive voice response (IVR) program, the method comprising:
    identifying a context of a unique voice prompt of the plurality of unique voice prompts;
    identifying a fixed period of silence required for a recording of the unique voice prompt based on the context;
    generating a modified recording of the unique voice prompt by:
        cropping an initial period of silence from an end of the recording of the unique voice prompt to create a cropped recording, and
        adding the fixed period of silence to an end of the cropped; and
    storing the modified recording of the unique voice prompt recording.

2. The method of claim 1, wherein the identifying the context comprises:
    identifying a punctuation context at an ending of a text script of the unique voice prompt.

3. The method of claim 2, wherein the punctuation context comprises at least one of:
    a sentence ending punctuation, a comma or a semi-colon, and no punctuation.

4. The method of claim 3, wherein the period of silence is different for each of the punctuation contexts.

5. The method of claim 1, wherein the cropping an initial period of silence further comprises:
    cropping an initial period of silence from a start of the recording of the unique voice prompt.

6. The method of claim 1, comprising:
    generating a list comprising two or more unique voice prompts of the plurality of unique voice prompts, each of the two or more unique prompts having a filename;
    identifying a context of the two or more unique voice prompts;
    identifying a period of silence in respective recordings of the two or more unique voice prompts based on their respective contexts;
    modifying the filenames of the two or more unique voice prompts to indicate the identified periods of silence for the respective recordings of the two or more unique voice prompts;
    grouping the filenames into groups of equal periods of silence; and
    generating a modified recording of each of the two or more unique voice prompts by adding a period of silence corresponding to a corresponding group of the two or more unique voice prompts.

7. A system for processing a plurality of recordings of a plurality of unique voice prompts of an interactive voice response (IVR) program, the system comprising a silence processing module comprising at least one processor and at least one operatively associated memory, the silence processing module programmed to:
    identify a context of a unique voice prompt of the plurality of unique voice prompts in the IVR program;
    identify a fixed period of silence required for a recording of the unique voice prompt based on the context;
    generate a modified recording of the unique voice prompt by:
        cropping an initial period of silence from an end of the recording of the unique voice prompt to create a cropped recording, and
        adding the fixed period of silence to an end of the cropped; and
    store the modified recording of the unique voice prompt recording.

8. The system of claim 7, wherein the context comprises:
    a punctuation context at an ending of a text script of the unique voice prompt.

9. The system of claim 8, wherein the punctuation context comprises at least one of:
    a sentence ending punctuation, a comma or a semi-colon, and no punctuation.

10. The system of claim 9, wherein the period of silence is different for each of the punctuation contexts.

11. The system of claim 7, wherein, when the silence processing module is programmed to crop an initial period of silence, the silence processing module is further programmed to:
    crop an initial period of silence from a start of the recording of the unique voice prompt.

12. The system of claim 7, wherein the silence processing module is further programmed to:
    generate a list comprising two or more unique voice prompts of the plurality of unique voice prompts, each of the two or more unique prompts having a filename;
    identify a context of the two or more unique voice prompts;
    identify a period of silence in respective recordings of the two or more unique voice prompts based on their respective contexts;
    modify the filenames of the two or more unique voice prompts to indicate the identified periods of silence for the respective recordings of the two or more unique voice prompts;
    group the filenames into groups of equal periods of silence; and
    generate a modified recording of each of the two or more unique voice prompts by adding a period of silence corresponding to a corresponding group of the two or more unique voice prompts.

13. A non-transitory computer readable medium comprising instructions that when executed by a processor cause the processor to perform:
    identifying a context of a unique voice prompt of the plurality of unique voice prompts;
    identifying a fixed period of silence required for a recording of the unique voice prompt based on the context;

generating a modified recording of the unique voice prompt by:
cropping an initial period of silence from an end of the recording of the unique voice prompt to create a cropped recording, and
adding the fixed period of silence to an end of the cropped; and
storing the modified recording of the unique voice prompt recording.

14. The non-transitory computer readable medium of claim 13, wherein the instructions further cause the processor to perform:
identifying a punctuation context at an ending of a text script of the unique voice prompt.

15. The non-transitory computer readable medium of claim 14, wherein the punctuation context comprises at least one of:
a sentence ending punctuation, a comma or a semi-colon, and no punctuation.

16. The non-transitory computer readable medium of claim 15, wherein the period of silence is different for each of the punctuation contexts.

17. The non-transitory computer readable medium of claim 13, wherein the cropping an initial period of silence further comprises:
cropping an initial period of silence from a start of the recording of the unique voice prompt.

* * * * *